July 4, 1933.  H. W. KULP ET AL  1,916,623
SHOULDERED STUD BOLT RIVETING OR SETTING DIE
Filed March 18, 1930
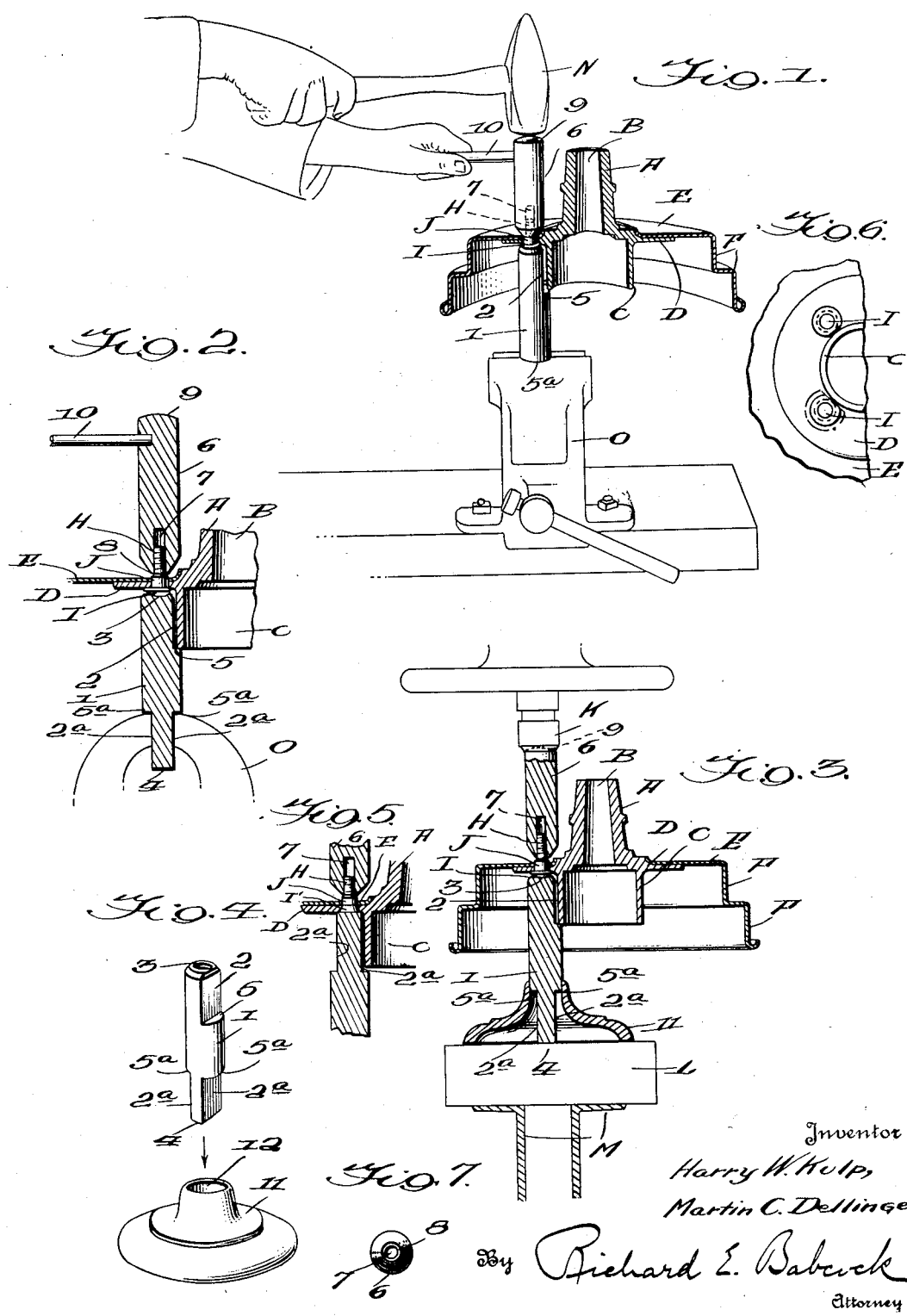
Inventor
Harry W. Kulp,
Martin C. Dellinger,
By Richard E. Babcock
Attorney Patented July 4, 1933

1,916,623

UNITED STATES PATENT OFFICE

HARRY W. KULP AND MARTIN C. DELLINGER, OF LANCASTER, PENNSYLVANIA

SHOULDERED STUD BOLT RIVETING OR SETTING DIE

Application filed March 18, 1930. Serial No. 436,766.

This invention relates to riveting, expanding and/or upsetting dies or means for shouldered bolts or stud bolts and is particularly intended for use in replacing the stud bolts securing the brake-drum and hubs of the Model A Ford automobile and other automobiles employing this same general construction, when said stud bolts become broken or worn or in case it is desired for any reason to replace them or the brake-drum or hub.

In said Model A Ford automobile wire spoke wheels, not shown, are employed, said wheels having a central tubular sleeve or sheet metal portion which fits over the cast or forged metal hubs A, said central tubular sleeve being formed intermediate its ends with a radial flange extending perpendicularly to the axis of the wheel and fitting against the outer face of the brake-drum web E and being secured thereto by means of the stud bolts passing through the radial flange D of the hub A, the web E of the brake-drum and the radial flange of said wheel sleeve and having nuts, not shown, screwed on their outer screw-threaded portions H.

The usual internal brake bands are disposed within the brake-drum with their outer frictional faces disposed closely adjacent the opposed radially inner faces of the annular flanges F respectively of the brake-drum, the inner or enlarged end of the brake-drum being closed in usual manner by a plate, not shown, to exclude dirt, grit and other foreign matter from the brake bands and working parts disposed within the closed interior of the brake-drum, and the means, not shown, for operating said brake bands, not shown, extend through said cover or plate, all according to usual known practice and as embodied in the Model A Ford automobile.

In case of a punctured tire, or other injury to a tire or wheel, the injured wheel, or the wheel carrying the injured tire, is removed by removing the nuts from the ends of the respective stud bolts, pulling said wheel axially of the said stud bolts until free therefrom, and is replaced with a duplicate spare wheel and tire by shoving the latter wheel axially toward the web E of the brake-drum, the respective stud bolts being received in corresponding perforations, not shown, of the radial flange of the spare wheel hub sleeve. In so applying the spare wheel there will be an endwise thrust exerted on the stud bolts tending to force them into the interior of the brake-drum. In fact, it quite frequently happens that the wheel sleeve or hub sleeve will strike against the ends of the stud bolts due to improper registry of its perforations with the stud bolts due to improper positioning of the wheel in the initial stages of mounting the extra wheel on the hub.

Said stud bolts are usually formed with a short enlarged shoulder or annular portion J of appreciably greater diameter than the screw-threaded portion H, said shoulder J in applied relation extending through the radial flange D of the hub A and the web E of the brake drum and being of a length greater than the combined thickness of said hub flange D and web E. In setting or riveting these stud bolts in the said flange D and web E pressure is exerted endwise of the bolt upon said shoulder J to reduce its length and expand it in cross-section or increase its diameter to make a tight binding or biting fit in the registering perforations of said flange D and web E, or in addition to such foreshortening and radial expanding the outer end of said shoulder J may be spread and riveted over against the outer face of the web E, or in lieu of such expanding the outer end portion of the shoulder J may be spread radially and/or riveted over against the outer face of the web E, any one of such operations serving to positively secure said stud bolts in position and prevent their being displaced in an axial direction.

The foregoing elements form no part of our invention but are thus briefly referred to simply to aid in giving a better understanding of our invention.

This present invention has for its objects primarily, the provision of a small portable set of dies for riveting or setting the stud bolts above referred to in operative position;

to provide a set of dies for such purpose suited to use either in conjunction with a powerful arbor or other suitable power press, or in conjunction with a hand hammer so as to lend itself freely to the needs of the small ill-equipped garage or repair shop as well as the large elaborately equipped garage or machine shop; to provide in such a set of dies an anvil die having interchangeable or reversible ends specially formed and designed for use in connection with a plurality of different head-type or form stud bolts; to provide an anvil die so formed as to be conveniently capable of being operatively positioned, presented and held in several different manners as the facilities available may require; to provide a special centering and positioning holder selectively receiving the respective end portions of said anvil die to present the other end portion thereof in proper position; to especially form the anvil die to receive pressure in a line coincident with its axis while retaining sufficient cross-section, or weight of metal to avoid distortion under pressure and yet permit its insertion into proper position with its axis close to and paralleling the axially extending face of the hub bearing sleeve C without engaging, or being displaced by said sleeve C or displacing or canting said sleeve C and the hub A rigid therewith; and to provide a pressure die so formed as to receive and protect the threaded portion of the stud bolt while applying pressure to and expanding, riveting or setting the enlarged portion J thereof; to provide a pressure die provided with a relatively long laterally extending handle for ease of manipulation and proper positioning particularly for use in connection with a hand hammer; to provide such a pressure die with a specially formed self-centering upper end surface for cooperation with the pressure foot of an arbor or other suitable power press; to form the lower or bored end of the pressure die in such manner as to give a great degree of visibility of the work during the actual riveting or setting operation; and to specially form the lower end face of the pressure die immediately adjacent and about the bore therein to bear upon and form the adjacent end of the shoulder J of the stud bolt being operated upon in such manner as desired.

In the accompanying drawing:

Figure 1 represents a perspective view illustrating the operation of our invention in connection with a bench vise and hand hammer, the hub and brake-drum being shown in section and a round-headed stud bolt being shown properly positioned in the registering perforations thereof;

Figure 2, a vertical central section through the dies and fragmentary portions of the hub and the web of the brake-drum, fragmentary portions of the jaws of the vise being shown in elevation;

Figure 3, a sectional view as used in an arbor press, the die supporting block being shown in elevation and the die supporting beam of the press and the pressure foot thereof being shown in fragmentary section and elevation respectively;

Figure 4, a superposed view of the die and the centering holder therefor preferably employed in using the die set in an arbor press, and which may be used also in substitution for the vise when employing a hand hammer;

Figure 5, a fragmentary sectional view of the set of dies as operatively applied to a flat-headed bevel-type stud bolt applied through the hub flange D and brake-drum web E, the flat plane non-recessed end of the anvil die being applied against and supporting the head of the stud bolt;

Figure 6, a reduced size fragmentary inner side elevation of the hub and brake drum, showing the spacing of the stud bolts and the form of their heads to positively prevent their rotation about their axes, the anvil die being indicated by dotted lines in its position as applied to one of said stud bolts during the riveting, setting, expanding or upsetting operation; and Figure 7, a bottom plan view of the pressure die 6.

Referring now in detail to the drawing, A indicates the hub having outwardly tapering bore B to receive the end of the axle and formed with a concentric axially inwardly extending bearing sleeve C and an annular radially extending perforated connecting flange D, E the web of the brake-drum formed of sheet metal in the Model A Ford and having two successive inwardly extending annular flanges F of different diameters to be engaged on their respective radially inner faces by the opposed radially outer faces of the respective brake bands, not shown, all according to known construction as embodied, for instance, in the Model A Ford, a recently introduced model and a well known make of automobile in practically universal use throughout the world.

Said web E and hub flange D are formed with a plurality of registering perforations to receive the usual stud bolts which have a screw-threaded outer end portion H, a convex head I as shown in Figures 1, 2 and 3, or a flat beveled type head I', as shown in Fig. 5, and an intermediate short annular shoulder or portion J of considerably larger diameter than screw-threaded portion H, said portion J extending from the head I or I' as the case may be and making a close fit in the perforations in the web E and flange D and being of a length appreciably in excess of the combined thickness of said web E and flange D.

The anvil die 1 is preferably cylindrical in cross-section with one end portion axially cut away to the flat axially extending face 2 to avoid interference with the bearing sleeve C of the hub A while insuring a sufficiently heavy rugged body to the anvil die and permitting its axis to be aligned with the axis of the stud bolt being operated upon and the central line of the application of pressure. The corresponding end face or anvil of the anvil die 1 is formed with a circular recess or concavity 3 concentric with the axis of the anvil die 1 and in operation receiving, centering and supporting the rounded or convex head I of the stud bolt being operated upon.

The other end portion of the anvil die 1 may be cut away axially on opposite sides to the parallel opposed flat axially extending faces 2a for the same length and depth as the first mentioned end, and will have a smooth uninterrupted extreme end face or anvil 4 all lying in the same plane for use with flat heads I' of flat headed beveled type stud bolts, as illustrated in Fig. 5.

The cutting away of the end portions to form the flat axially extending faces 2 and 2a respectively results in forming the respective transversely extending shoulders 5 and 5a.

The cooperating pressure die 6 is preferably cylindrical in shape with its lower end portion frusto-conical in form to promote visibility of the work during the setting or riveting operation, and is formed with a bore 7 concentric with its axis and extending upward from its lower end for a distance considerably in excess of the length of the screw-threaded portion H of such a stud bolt, said bore being open at its lower end and of an internal diameter such as to snugly slidably receive such portion H of such a bolt and not to receive the enlarged annular portion or shoulder J thereof. The extreme lower end face of said pressure die 6 may be formed with a narrow flat annular face 8 all lying in the same plane and extending radially from the said bore 7, as well shown in Fig. 7, or the cone shape may be continued right up to, and practically intersect, the wall of said bore 7 to form an extremely narrow annular edge, which may or may not be a sharp cutting edge, or said annular edge may be interrupted with a series of notches to promote endwise compression of the shoulder J, or said extreme lower end face of the pressure die 6 may be annularly grooved from immediately adjacent said bore 7, the inner side of said groove forming a cutting edge where it intersects the wall of said bore 7 and said groove serving to upset the material of said shoulder as cut into by said cutting edge, as well as to compress said shoulder J endwise to expand it radially, or said extreme lower end portion of the pressure die 6 may be otherwise formed to achieve the desired end either by compressing the shoulder J as a whole lengthwise, so decreasing its length and increasing its diameter, or by spreading the outer end of the shoulder J while also expanding said shoulder radially, or by spreading and upsetting the outer end of said shoulder J while compressing said shoulder as a whole axially and expanding it radially, or by spreading the outer end of said shoulder J or otherwise operating upon said shoulder J to achieve the desired result.

The pressure die 6 preferably has a convex self-centering upper end surface 9 to cooperate with the lower concave face of the pressure foot K of an arbor or other suitable and conveniently available power press, and also is preferably provided with a handle 10 rigid with said pressure die 6 whereby the said pressure die 6 may be easily and conveniently held in correct operative position with one hand and struck with a hand hammer N held in the other hand in case no arbor or other suitable power press is readily available, so that a single operative or mechanic may perform the entire setting or riveting operations readily and conveniently under all conditions.

The centering and positioning holder 11 will have a flat bottom surface and be formed with a central bore 12 extending perpendicularly to said bottom surface and of such size as to selectively snugly receive either end portion of said anvil die 1, the greatest cross-sectional dimensions of which are identical in length.

Said holder 11 when employed will preferably be placed upon a supporting metal block or plate L having an upper surface all lying in a single plane. In use in connection with an arbor or other suitable power press said holder 11 will preferably be employed and its supporting block L will be placed upon the usual horizontal supporting beam or press anvil M, as indicated fragmentarily in Fig. 3, when the head I or I' of the stud bolt to be operated upon and as inserted in the perforations of the flange D and web E will be rested upon, and centered with relation to, the upper end of anvil die 1, with the adjacent portion of bearing sleeve C extending inward of the cylindrical middle portion of anvil die 1 closely adjacent to face 2 and in alignment with shoulder 5. The pressure die 6 is then to be slipped over the screw-threaded portion H of said stud bolt until its extreme lower end face 8 rests on the upper end of shoulder J of the stud bolt. As thus related the dies 1 and 6 together with the stud bolt are next centered with relation to the pressure foot K of the press, which is then operated to force pressure die 6 toward anvil die 1 with resultant foreshortening and radial expansion, or spreading and upsetting, or spreading, of the shoulder J, or the other portion thereof, of said stud bolt, to positively hold or set it in said flange D and web E against axial movement relative thereto, the end sought.

In case no arbor or other suitable power press is available, one end portion of the anvil die 1 may be inserted between the jaws of a bench vise O which jaws respectively engage with either the opposed flat faces 2a, with the shoulders 5a resting on the tops of said vise jaws, as illustrated in Fig. 1, or the flat face 2 and the opposite cylindrical portion with the shoulder 5 resting on the top of one of said jaws. With the anvil die 1 so held in the vise O, the parts are arranged as above described, the pressure die 6 being held by the handle 10 in proper position by one hand by the operator while he strikes the upper end 9 thereof with a hand hammer gripped in his other hand, such blows with said hand hammer N being repeated until the "setting" operation has been satisfactorily completed.

In case no vise O is available for use in connection with the above hand operation, or in case the mechanic should prefer, the holder 11 may be substituted for the vise O, the lower end of the anvil die 1 in such case preferably resting squarely on a metal block such as L illustrated in Fig. 3.

The radially outer portion of the end portion of the anvil die 1 formed with concave stud bolt head seat 3 will preferably be beveled off as illustrated, particularly across the flat face 2, such beveling serving to accommodate a fillet that may be placed in the angle between the inner face of the radial flange D and the outer face of the axially extending bearing sleeve C, or irregularities in the face of one or the other or both of said parts D and C at or adjacent said angle, or foreign matter that may become embedded or caked in said angle.

We claim:

A set of dies for expanding the cross-sectionally enlarged shoulder of a stud bolt in the registering perforations of a hub flange and brake-drum web and closely adjacent to the axially inwardly extending hub bearing sleeve, said set of dies comprising an anvil die having a portion adapted to extend closely adjacent to said bearing sleeve and to engage and support the head of the stud bolt, in combination with a pressure die having a bore of uniform diameter throughout its length and of greater length than the screw-threaded portion of said stud bolt and just snugly receiving slidably said screw-threaded portion, the face of the lower portion of said pressure die tapering inwardly and downwardly and intersecting the wall of said bore to form an annular edge surface adapted to engage, cut into, and spread the enlarged annular shoulder of the stud bolt.

In testimony whereof, we have signed our names to this specification at Lancaster, Pennsylvania, this 28th day of February 1930.

HARRY W. KULP.
MARTIN C. DELLINGER.